UNITED STATES PATENT OFFICE.

JOHN HENDRICHS, OF BROOKLYN, NEW YORK.

BASE FOR SAFETY LITHOGRAPHIC INKS.

SPECIFICATION forming part of Letters Patent No. 239,954, dated April 12, 1881.

Application filed July 21, 1880. (Specimens.)

*To all whom it may concern:*

Be it known that I, JOHN HENDRICHS, of Brooklyn, in the county of Kings and State of New York, have invented certain new and useful Improvements in Bases for Safety Lithographic Inks; and I do hereby declare that the following is a full, clear, and exact description of the invention, which will enable others skilled in the art to which it appertains to make and use the same.

This invention relates to an improved base for black ink for lithographers' use, the object of which is to prevent the altering, raising, or changing by the use of acids of any note, draft, check, or document printed therewith. To this end it is composed of the following ingredients, in about the proportions as follows; to wit:

| | |
|---|---|
| Drop-white | 7 ounces |
| Copperas | 2 " |
| Bichromate of potash | 2 " |
| Flowers of sulphur | 2 " |
| Black union dye | 3 " |
| Total | 16 ounces |

"Black union dye," as it is termed, is composed of extract of logwood dissolved in alcohol or hot water, or both. When put in combination with copperas it becomes a deep heavy black, which again, when combined with flowers of sulphur and bichromate of potash, forms a black dye, which, when touched with acids, changes into a dirty red.

Drop-white (also known as "hopper-white") is a heavy oxide of zinc, which is used to give the requisite body to the compound. For printing purposes it is preferable to the lighter oxide of zinc, known as "flake-white;" but the latter may be used without changing the spirit of my invention.

In compounding the ink-base I first grind the copperas and bichromate of potash in hot water. The drop-white is then ground into it, and the sulphur added. The black union dye is then ground separately with alcohol and hot water, and when thoroughly dissolved the ingredients are mixed. A table-spoonful of muriatic acid may be added to give the ink a bright black color. The alcohol and water are now allowed to evaporate, and the dye is then ready to be ground with some ordinary printers' or lithographers' varnish for printing or lithographing purposes, as the case may be.

Ink made from my improved base may be produced at a less expense than lithographers' ink now commonly used, and notes, drafts, &c., printed therewith are safe from alteration, inasmuch as the ink, as above stated, when touched with acids, will change into a dirty red.

Having thus described my invention, I claim and desire to secure by Letters Patent of the United States—

An improved black-ink base for lithographers' or printers' use, composed of drop-white, copperas, bichromate of potash, flowers of sulphur, and black union dye, in about the proportions named, for the purpose herein set forth.

In testimony that I claim the foregoing as my own I have hereto affixed my signature in presence of two witnesses.

JOHN HENDRICHS.

Witnesses:
 LOUIS APT,
 CH. W. HAUBER.